United States Patent
Lin et al.

(10) Patent No.: US 11,310,110 B2
(45) Date of Patent: Apr. 19, 2022

(54) PROVISIONAL MODES FOR MULTI-MODE NETWORK DEVICES

(71) Applicant: ARRIS Enterprises LLC, Suwanee, GA (US)

(72) Inventors: Kwun-Nan Kevin Lin, Saratoga, CA (US); Tian Lei, San Jose, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/931,087

(22) Filed: Jul. 16, 2020

(65) Prior Publication Data

US 2020/0351161 A1 Nov. 5, 2020

Related U.S. Application Data

(63) Continuation of application No. 15/229,012, filed on Aug. 4, 2016, now Pat. No. 10,721,123.

(60) Provisional application No. 62/235,413, filed on Sep. 30, 2015.

(51) Int. Cl.
| | |
|---|---|
| *H04L 12/24* | (2006.01) |
| *H04L 41/0816* | (2022.01) |
| *H04L 41/28* | (2022.01) |
| *H04L 45/02* | (2022.01) |
| *H04L 41/0869* | (2022.01) |

(Continued)

(52) U.S. Cl.
CPC ...... *H04L 41/0816* (2013.01); *H04L 41/0869* (2013.01); *H04L 41/12* (2013.01); *H04L 41/28* (2013.01); *H04L 45/02* (2013.01); *H04L 51/00* (2013.01)

(58) Field of Classification Search
None
See application file for complete search history.

(56) References Cited

U.S. PATENT DOCUMENTS

| | | |
|---|---|---|
| 6,950,855 B2 | 9/2005 | Sampathkumar |
| 7,558,835 B1 | 7/2009 | Shafer |
| 7,675,869 B1 | 3/2010 | Anker et al. |

(Continued)

FOREIGN PATENT DOCUMENTS

| | | |
|---|---|---|
| EP | 2696538 | 2/2014 |
| WO | 2017062671 | 4/2017 |
| WO | 2017070587 | 4/2017 |

OTHER PUBLICATIONS

Chandra Konathala: Bridge port Extension—802.1B; Brocade; Mar. 3, 2014; 38 pages.

(Continued)

*Primary Examiner* — James A Edwards
(74) *Attorney, Agent, or Firm* — Stewart A. Wiener; Myers Bigel, P.A.

(57) ABSTRACT

Techniques for implementing a provisional mode in a multi-mode network device (i.e., a network device that supports at least first and second modes of operation) are provided. According to one embodiment, the network device can receive, while running in the first mode, a request to enter the second mode. In response to the request, the network device can enter a third mode that is a provisional version of the second mode. Then, while running in the third mode, the network device can accept one or more configuration commands or settings for the second mode while simultaneously processing live network traffic according to the first mode.

19 Claims, 7 Drawing Sheets

(51) Int. Cl.
*H04L 41/12* (2022.01)
*H04L 51/00* (2022.01)

(56) References Cited

U.S. PATENT DOCUMENTS

| | | | |
|---|---|---|---|
| 7,904,599 B1* | 3/2011 | Bennett | H04L 67/1097 709/249 |
| 2006/0034228 A1 | 2/2006 | Kim et al. | |
| 2007/0014261 A1 | 1/2007 | Lee | |
| 2007/0249354 A1 | 10/2007 | Seo et al. | |
| 2009/0131054 A1 | 5/2009 | Zhang | |
| 2010/0014525 A1* | 1/2010 | Rehman | G06F 13/387 370/395.7 |
| 2010/0015973 A1 | 1/2010 | Islam et al. | |
| 2011/0096659 A1* | 4/2011 | Cardona | H04L 45/22 370/220 |
| 2012/0179845 A1* | 7/2012 | Nie | G06F 13/102 710/14 |
| 2012/0307727 A1* | 12/2012 | Yamada | H04L 45/586 370/328 |
| 2013/0064132 A1* | 3/2013 | Low | H04W 24/02 370/254 |
| 2014/0156906 A1* | 6/2014 | Babu | G06F 13/4027 710/316 |
| 2014/0162620 A1 | 6/2014 | Geng et al. | |
| 2014/0181275 A1 | 6/2014 | Lin et al. | |
| 2014/0269710 A1* | 9/2014 | Sundaram | H04L 45/302 370/392 |
| 2015/0074246 A1* | 3/2015 | Premji | H04L 49/356 709/220 |
| 2015/0078392 A1 | 3/2015 | Yan | |
| 2015/0117455 A1 | 4/2015 | Umesh et al. | |
| 2015/0163173 A1 | 6/2015 | Chu et al. | |
| 2015/0339249 A1 | 11/2015 | Dharmadhikari et al. | |
| 2016/0085560 A1* | 3/2016 | Gourlay | G06F 13/4022 713/2 |
| 2017/0063668 A1 | 3/2017 | Sivasankar et al. | |
| 2017/0085488 A1 | 3/2017 | Bhattacharya et al. | |
| 2017/0104626 A1 | 4/2017 | Lin et al. | |
| 2017/0104665 A1 | 4/2017 | Gowthaman | |
| 2017/0104694 A1 | 4/2017 | Lin et al. | |
| 2017/0111296 A1 | 4/2017 | Agarwal et al. | |
| 2017/0118041 A1 | 4/2017 | Bhattacharya et al. | |
| 2017/0118042 A1 | 4/2017 | Bhattacharya et al. | |
| 2018/0063035 A1 | 3/2018 | Lin | |
| 2018/0069808 A1 | 3/2018 | Agarwal | |

OTHER PUBLICATIONS

Dev Datta: EPI—Campus Satellite Solution; Brocade; Aug. 4, 2016; 13 pages.
Vignesh Hariharan: Campus Fabric; Brocade Communications Systems Inc.; 2015; 40 pages.
Selling Campus Fabric FY16, Introducing Campus Fabric; Brocade Communications Systems, Inc.; 2015; 18 pages.
Dell C9010 Module Switch Interoperability with Cisco Catalyst 3750, A Development Guide for Dell Networking Switches (v1.0), Dell Network Solutions Engineering, Sep. 2015, 24 pages.
Dell Networking C1048P Getting Started Guide, Sep. 2015, 26 pages.
Juniper Networks, Junos Fusion Provider Edge, Release 14.2R4, Feb. 17, 2016, 646 pages.
Cisco StackWise and StackWise Plus Technology, 2016 Cisco, Mar. 25, 2016, 11 pages.
Dell Stack Master Election, Dell Networking Configuration Guide for the C9000 Series Version 9.9 (0.0), Mar. 25, 2016, 1 page.
Dell Networking Configuration Guide for the C9000 Series, Version 9.9 (0.0), Oct. 2015, 1148 pages.
Cisco Nexus 5600 Series NX-OS Layer 2 Switching Configuration Guide, Release 7.x; Mar. 15, 2014; Cisco Systems, Inc.; 280 pages.
Configuring the Fabric Extender, Chapter 2; Cisco Nexus 2000 Series Fabric Extender Software Configuration Guide; 16 pages.
Configuring Port Extender Stack; Dell Networking C9010/C1048P; Jan. 30, 2017; https://qrl.dell.com/Files/enus/Html/C9010_C1048P/Configuring%20PE%20Stack.html; 3 pages.
Understanding Junos Fusion Provider Edge Components; Technical Documentation—Support—Juniper Networks; Mar. 31, 2017; 5 pages; https://www.juniper.net/documentation/en_US/junos/topics/concept/fusion-components.html.
International Search Report and Written Opinion for International Appln. No. PCT/US2016/055827, dated Jan. 25, 2017, 15 pages.
Virtual Bridged Local Area Networks-Bridge Port Extension, IEEE Computer Society, IEEE Std 802.1 BR-2012, Jul. 16, 2012, 121 pages.
Brocade FastIron Switch Port Extender, Configuration Guide, Supporting FastIon Software Release 8.0.40, Feb. 29, 2016, 88 pages.
International Search Report and Written Opinion for International Appln. No. PCT/US2016/058283, dated Feb. 17, 2017, 12 pages.
Lockwood et al., "Automated Tools to Implement and Test Internet Systems In Reconfigurable Hardware", ACM SIGCOMM Computer Communications Review, vol. 33, No. 3, Jul. 2003, pp. 103-110.

* cited by examiner

PROVISIONAL MODES FOR MULTI-MODE NETWORK DEVICES

CROSS-REFERENCES TO RELATED APPLICATIONS

The present application is a continuation of U.S. patent application Ser. No. 15/229,012, filed Aug. 4, 2016, which claims the benefit and priority of U.S. Provisional Application No. 62/235,413, filed Sep. 30, 2015, entitled "Provisional Modes for Dual-Mode Network Devices," the entire contents of each of which are incorporated herein by reference in their entireties for all purposes.

BACKGROUND

An 802.1BR-based network topology (referred to herein as an extended bridge) is a logical network entity that comprises two types of units: a controlling bridge (CB) unit and one or more port extender (PE) units. The CB serves as the controller of the extended bridge and is responsible for performing control plane functions (e.g., Layer 2 switching, Layer 3 routing, etc.) with respect to network traffic passing through the bridge. In contrast, the PEs, which connect the CB with other devices/hosts external to the extended bridge, act as non-intelligent devices and thus do not perform any local switching or routing; instead, their primary function is to provide additional data port terminations for the CB (thereby extending the port capacity of the CB). For example, each PE may be a switch/router with X number of physical data ports, which appear as virtual data ports on the CB. Upon receiving a data packet from an external device/host on an ingress data port, the PE forwards the data packet through an internal link to the CB, which processes the data packet in hardware or software to determine an appropriate egress port through which the packet should be sent out. The CB then forwards the data packet to the PE housing the determined egress port for transmission through that port towards the next hop destination.

Since the role of PEs in an extended bridge is relatively simple, the PEs can be implemented using relatively low-end network devices. For flexibility in deployment, some networking vendors have designed such low-end devices to support two different modes of operation: a switch/router mode and a PE mode. In switch/router mode, the network device can perform local switching and/or routing of traffic and can allow a user to configure the various rules and settings needed to support such behaviors. This allows the device to operate as a standalone switch/router in a network. In contrast, in PE mode, the network device can perform the functions of a PE unit as defined in the 802.1BR standard. As part of this mode, the network device can limit user configuration to the settings and commands that are relevant to PE mode operation.

One issue with supporting separate switch/router and PE modes as noted above is that, in existing implementations, the network device is generally required to run in a given mode in order for a user to enter and validate configuration settings for that mode. This requirement can lead to various network management problems. For example, assume that an organization has a network of high-end and low-end switches/routers in a production deployment. Further assume that the organization wishes to convert (i.e., re-deploy) the low-end switches/routers into PE units, so that traffic passing through those devices can be centrally processed at one of the high-end switches/routers (acting as a CB) for better management. In this scenario, a user must first reload each low-end switch/router from switch/router mode into PE mode, and then input and validate PE configuration settings while the device is running in PE mode. This process can be time-consuming and requires the devices to be taken offline in the production environment during PE configuration and validation, resulting in significant network downtime.

Another issue with supporting separate switch/router and PE modes is that, in existing implementations, there are generally no safeguards for preventing the network device from inadvertently switching from one mode to the other (due to, e.g., user configuration error or an unintentional device reload). Because of the significant operational differences between switch/router mode and PE mode, such an inadvertent mode switch can cause a critical failure in the network.

SUMMARY

Techniques for implementing a provisional mode in a multi-mode network device (i.e., a network device that supports at least first and second modes of operation) are provided. According to one embodiment, the network device can receive, while running in the first mode, a request to enter the second mode. In response to the request, the network device can enter a third mode that is a provisional version of the second mode. Then, while running in the third mode, the network device can accept one or more configuration commands or settings for the second mode while simultaneously processing live network traffic according to the first mode.

The following detailed description and accompanying drawings provide a better understanding of the nature and advantages of particular embodiments.

DETAILED DESCRIPTION

Figure 1A:
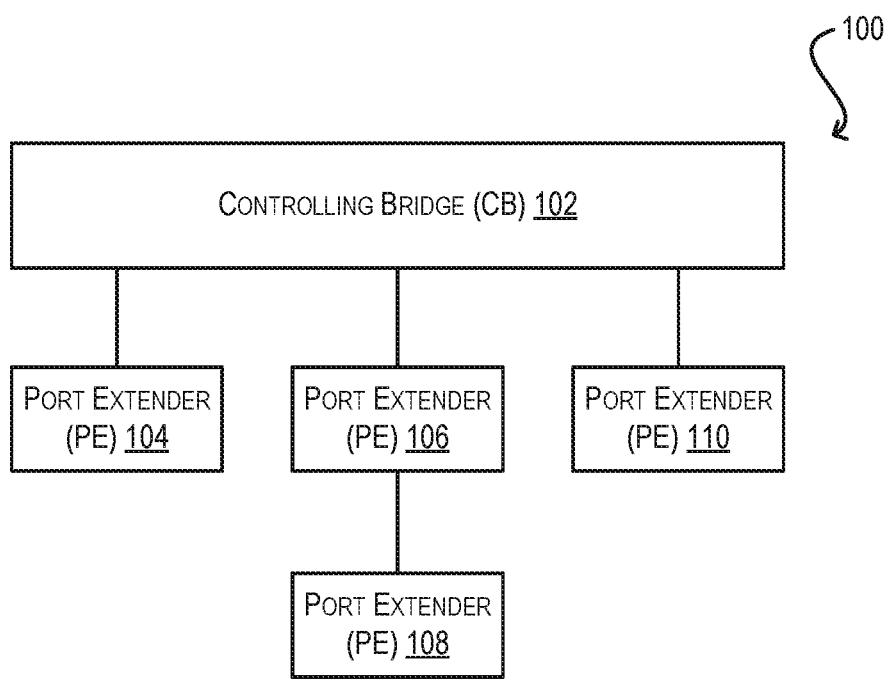
FIGS. 1A and 1B depict an example extended bridge and an example switch/router architecture according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for facilitating the conversion of a network device from a first mode of operation (e.g., switch/router mode) to a second mode of operation (e.g., PE mode) via a third mode that is a provisional version of the second mode. This third mode is referred to herein as "provisional PE mode." When the network device is running in provisional PE mode, users can enter, validate, and save configuration commands/settings that are relevant to PE mode. At the same time, while in provisional PE mode, the network device can continue to operate (i.e., process live network traffic) as if it were running in switch/router mode. Thus, with this feature, the network device does not need to be reloaded from switch/router mode into PE mode in order to configure PE-related settings. Instead, the network device can simply be placed into provisional PE mode, which exposes all of the configuration of PE mode while allowing the device to run under the operational rules of switch/router mode. This can significantly reduce the amount of time needed to convert the network device from a conventional switch/router to a PE unit in a production deployment, since users do not need to take the device offline (in PE mode) to carry out PE configuration and validation.

In certain embodiments, provisional PE mode can exhibit a substantially similar "look-and-feel" as PE mode to a user. This look-and-feel can include, e.g., the types of configuration settings, commands, and/or user interface (UI) elements that are presented to the user. This enhances the user's experience because it imposes a level of UI consistency between the provisional PE and PE modes. One technical difference is that, in some embodiments, provisional PE mode may not allow a user to view operational data that is specific to PE mode (which is logical since the network device operates as a conventional switch/router, rather than as a PE unit, while in provisional PE mode). Another technical difference is that, when a user inputs/validates PE configuration settings while in provisional PE mode, those settings are simply written to volatile PE configuration data structures of the network device, without changing the runtime operation of the network device (note that the settings may also be saved to a nonvolatile PE configuration file if the user issues an explicit save command). In contrast, when the user inputs/validates PE configuration settings while in PE mode, those settings are both written to the PE configuration data structures as well as to operational data structures that affect the device's runtime operation.

In further embodiments, the network device can be configured such that the device may only be reloaded into PE mode from provisional PE mode (or from PE mode itself); in other words, the network device cannot be directly switched over from switch/router mode to PE mode, or vice versa. This acts as a safeguard that prevents the network device from being inadvertently switched between the switch/router and PE modes due to, e.g., user error, a power failure, etc. In one embodiment, this safeguard can require the user to perform the following series of steps in order to enter PE mode: (1) input a request to enable PE mode (in the form of, e.g., a "PE-enable" command/parameter), thereby entering provisional PE mode; (2) invoke, while in provisional PE mode, a save command for writing the PE-enable parameter (along with other entered PE settings) to a nonvolatile PE configuration file; and then (3) invoke, after issuing the save command, a reload command. Upon the completion of these steps, the network device will boot up, detect the presence of the PE-enable parameter in the PE configuration file, and accordingly begin operating in PE mode.

In yet further embodiments, the network device can freely enter provisional PE mode from switch/router mode, and return back to switch/router mode from provisional PE mode, without affecting the processing of live network traffic and without requiring a device reload. This allows users to take their time in entering and reviewing PE settings, and makes it easy for the user to switch back to switch/router mode on an as-needed basis (e.g., to change or view switch/router settings). In certain embodiments, the PE configuration settings that are entered while in provisional PE mode can be maintained and preserved separately from the configuration settings that are entered while in switch/router mode. For example, as mentioned above, PE configuration settings can be maintained in volatile PE configuration data structures (and a nonvolatile PE configuration file if the user issues a save), while switch/router configuration settings can be maintained in volatile switch/router configuration data structures (and a nonvolatile switch/router configuration file if the user issues a save). This ensures that that no configuration information is lost when the user goes back and forth between switch/router and provisional PE modes.

In addition, when the network device is switched from provisional PE mode to switch/router mode, the network device can automatically remove the PE-enable parameter from the nonvolatile PE configuration file (if it exists). This prevents the device from rebooting into PE mode in scenarios where the user invokes a reload command after returning to switch/router mode.

The foregoing and other aspects of the present disclosure are described in further detail in the sections that follow. It should be noted that, while the examples and embodiments described herein relate to network devices that support switch/router and PE modes, the techniques of the present disclosure are not limited to this context and may be generally applied to any multi-mode network device that supports at least two different modes of operation. Further, although the present disclosure discusses the implementation of a single type of provisional mode (i.e., provisional PE mode), it is also possible to implement multiple provisional modes based on the same principles (e.g., a provisional PE mode for entering/validating/saving configuration settings pertaining to PE mode and a provisional switch/router mode for entering/validating/saving configuration settings pertaining to switch/router mode). One of ordinary skill in the art will recognize many variations, modifications, and alternatives.

2. Example Extended Bridge and Switch/Router Architecture

FIG. 1A depicts an extended bridge 100 in which embodiments of the present disclosure may be implemented. As shown, extended bridge 100 comprises a controlling bridge (CB) 102 that is connected to a number of port extenders (PEs) 104-110. CB 102 may be implemented using a relatively high-end switch/router that is capable of handling control plane functions (e.g., L2 forwarding, L3 routing, bridge management, etc.) for the entirety of extended bridge 100. In contrast, PEs 104-110 may be implemented using relatively lower-end switches/routers that are sufficient for carrying out PE functions as defined in the IEEE 802.1BR standard. For example, in one embodiment, CB 102 may be a high-cost, modular chassis-based switch/router, while PEs 104-110 may be lower-cost, "pizza box" style fixed-form factor switches/routers.

Figure 1B:
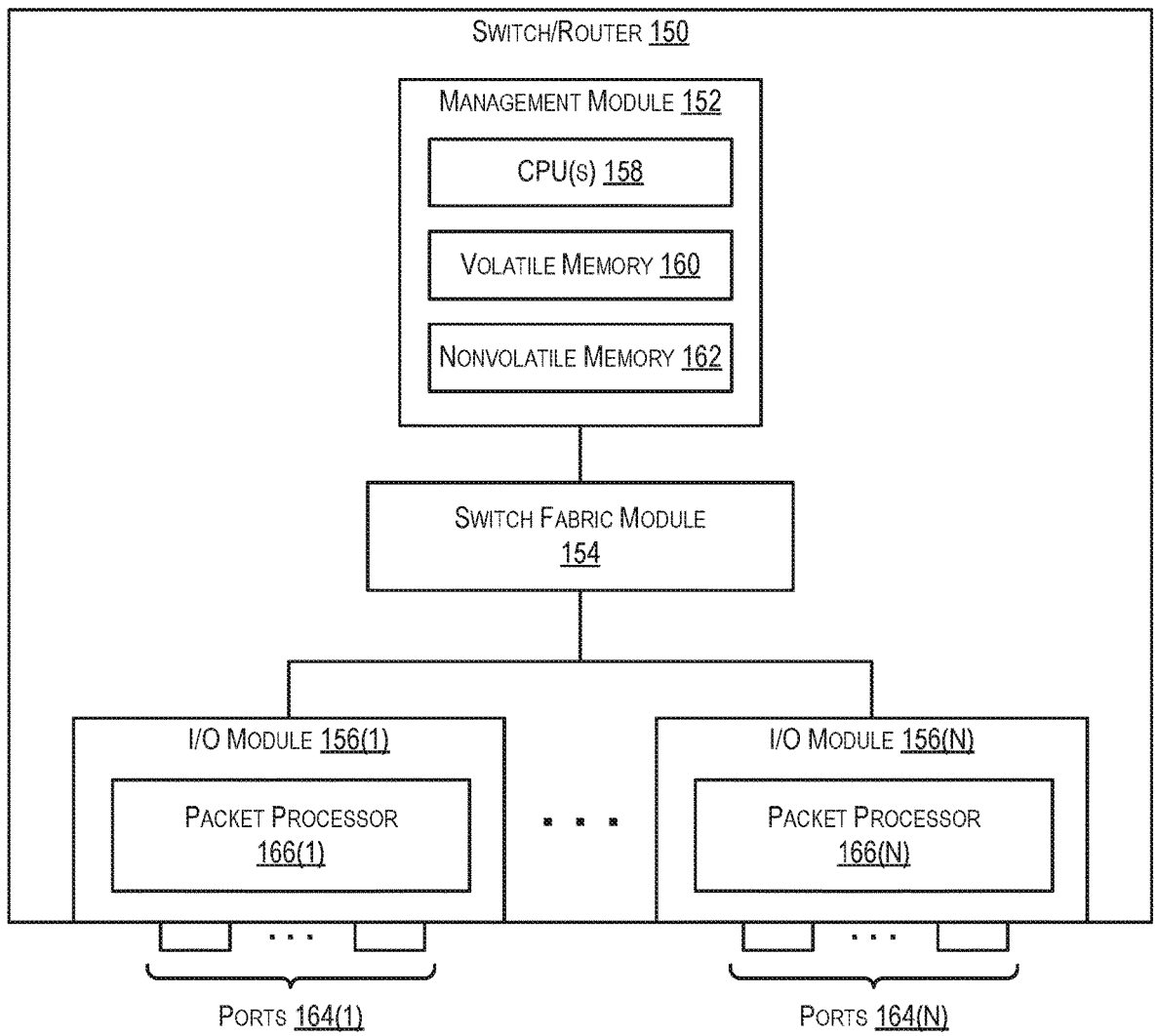

FIG. 1B depicts the architecture of an example switch/router 150 that may be used to implement PEs 104-110 of FIG. 1A according to an embodiment. As shown in FIG. 1B, switch/router 150 comprises a management module 152, a switch fabric module 154, and one or more I/O modules 156(1)-(N). Management module 152 includes one or more management CPUs 158 for managing/controlling the operation of switch/router 150. Each management CPU 158 can be a general purpose processor, such as a PowerPC, Intel, AMD, or ARM-based processor, that operates under the control of software stored in an associated volatile memory (e.g., RAM) 160 and/or nonvolatile memory (e.g., ROM, flash memory, etc.) 162.

Switch fabric module 154 and I/O module(s) 156(1)-(N) collectively represent the data, or forwarding, plane of switch/router 150. Switch fabric module 154 is configured to interconnect the various other modules of switch/router 150. Each I/O module 156(1)-(N) includes one or more ports 164(1)-(N) that are used by switch/router 150 to send and receive data packets to/from other networks/hosts, as well as to/from other units within extended bridge 100 of FIG. 1A. Each I/O module 156(1)-(N) also includes a packet processor 166(1)-(N) that can make wire speed decisions on how to handle incoming or outgoing data packets.

As noted the Background section, some networking vendors have developed switches/routers that support at least two modes of operation: a switch/router mode and a PE mode. When operating in switch/router mode, the switch/router performs local switching and routing of network traffic. On the other hand, when operating in PE mode, the switch/router does not perform any local switching or routing, and instead forwards all network traffic to a CB for processing. This dual-mode approach allows the switch/router to be flexibly deployed as a standalone network device in non-802.1BR networks, and as a PE unit in 802.1BR topologies such as extended bridge 100 of FIG. 1A. However, existing implementations of this dual-mode approach suffer from a number of limitations and drawbacks, which include (1) requiring the switch/router to be running in PE mode in order for a user to enter and validate PE configuration settings (which may not be practical if the device is deployed in switch/router mode in a production environment), and (2) failing to provide any protection against inadvertent switchovers between the switch/router and PE modes.

To address the foregoing and other similar issues, switch/router 150 of FIG. 1B can be enhanced to support a novel provisional PE mode that is a provisional version of PE mode. This enhancement can be implemented via, e.g., program code that resides in volatile memory 160 and/or nonvolatile memory 162 and is executed by management CPU(s) 158. Alternatively or in addition, this enhancement can be implemented via one or more new hardware modules that are added to switch/router 150 (not shown). Generally speaking, provisional PE mode can facilitate the conversion of switch/router 150 from switch/router mode to PE mode by allowing a user to enter, validate, and save PE-related configuration settings while the device is operating in accordance with switch/router mode (i.e., is actively processing live network traffic as a conventional L2/3 switch/router). This advantageously avoids the need for switch/router 150 to be reloaded into PE mode in order to carry out PE configuration and testing, which can substantially reduce the amount of network downtime needed for the conversion if switch/router 150 is already deployed in switch/router mode in a production environment. Provisional PE mode can also provide a number of other advantages (e.g., preventing unintentional device reloads from switch/router mode to PE mode or vice versa, improved user experience, easy switching between switch/router and provisional PE modes, etc.) which have been noted in the Overview section and are described in further detail below.

3. High-Level Workflow

Figure 2:
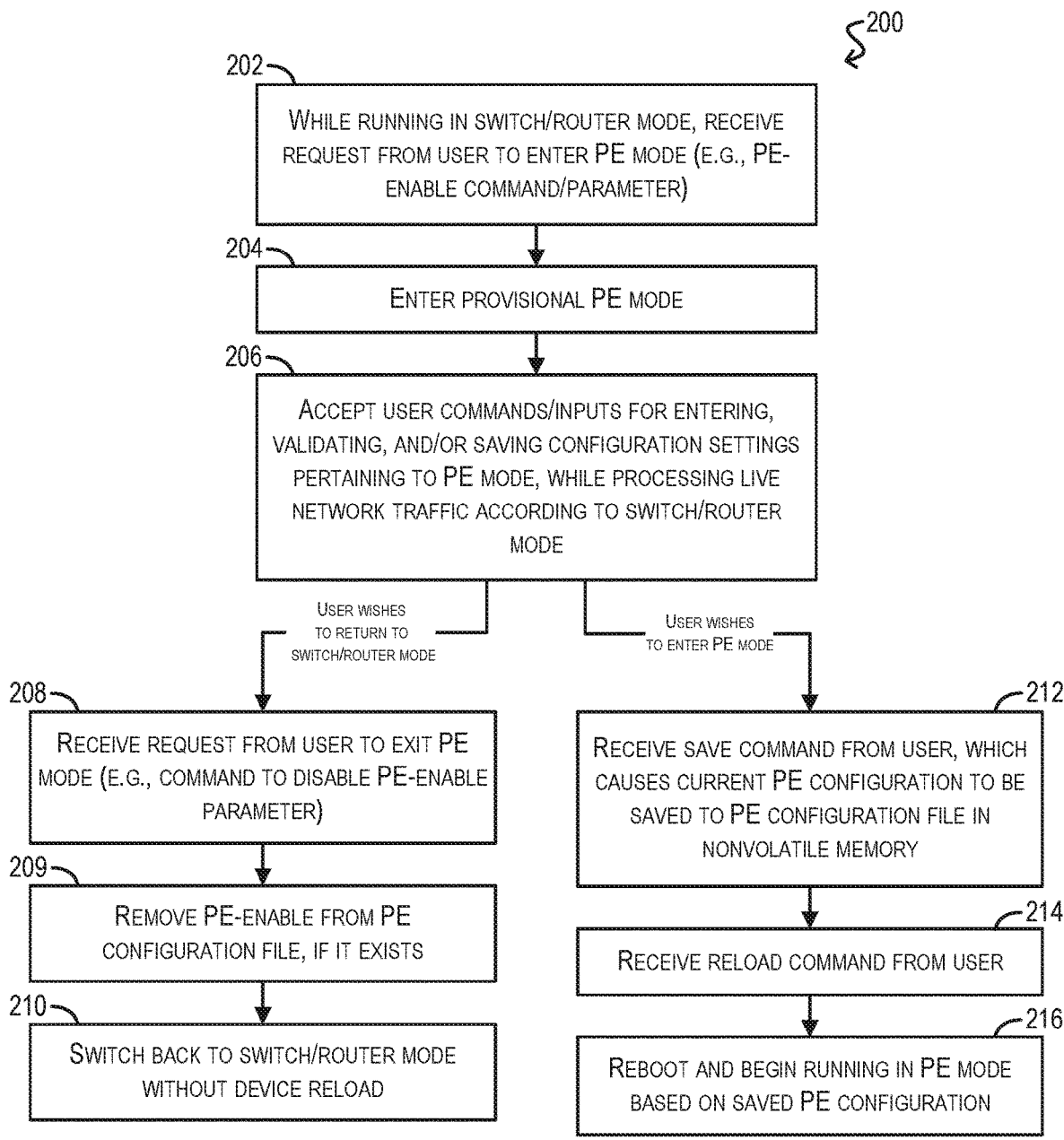
FIG. 2 depicts a high-level workflow that may be executed by a switch/router for facilitating conversion of the device from switch/router mode to PE mode via a provisional PE mode according to an embodiment.

FIG. 2 depicts a high-level workflow 200 that may be executed by switch/router 150 of FIG. 1B for facilitating the conversion of the device from switch/router mode to PE mode using a provisional PE mode according to an embodiment. Workflow 200 assumes that switch/router 150 is currently running in switch/router mode and that a user wishes to enter and validate PE configuration settings on switch/router 150 in order to, e.g., re-deploy the device in an 802.1BR topology.

Starting with block 202, switch/router 150 can receive, while running in switch/router mode, a request from the user to enter PE mode. In a particular embodiment, this request can take the form of, e.g., a "PE-enable" command/parameter that is entered via a management command line interface (CLI) or other UI of switch/router 150.

In response to the request, switch/router 150 can enter provisional PE mode (block 204). As part of this step, switch/router 150 can present a look-and-feel for the management CLI/UI that is substantially similar to the look-and-feel that is presented when the switch/router is running in PE mode. For example, switch/router 150 can present a command prompt or UI elements that make the device appear as if it is running in PE mode (or a derivation thereof). Switch/router 150 can also limit the list of available commands, configuration settings, and help options to the commands/settings/help options that are available in PE mode. This enforces a sense of UI consistency between the two modes, and therefore makes it easier for the user to navigate and interact with the provisional PE mode. In certain embodiments, the management CLI/UI presented in provisional PE mode may block commands for viewing operational data related to PE mode (since switch/router 150 is not actually running in PE mode). The management CLI/UI presented in provisional PE mode may also block commands related to switch/router mode.

At block 206, switch/router 150 can accept various user commands/inputs for entering, validating, and/or saving configuration settings pertaining to PE mode. For example, switch/router 150 may receive a command for setting the port speed for one or more ports when in PE mode. In response, switch/router 150 can store the entered port speed in a PE configuration data structure maintained in volatile memory 160. As another example, switch/router 150 may receive a command for validating whether uplink and downlink ports have been defined correctly for PE mode. In response, switch/router 150 can invoke an appropriate validation function and return a validation result to the user. As yet another example, switch/router 150 may receive a command for saving all of the entered/validated PE configuration settings (as stored in the volatile PE configuration data structures) to nonvolatile memory 162. In response, switch/router 150 can write the contents of the PE configuration data structures (which includes the PE-enable parameter entered at block 202) to a PE configuration file stored in nonvolatile memory 162.

Significantly, while switch/router 150 is accepting these commands, switch/router 150 can continue to process live network traffic as if it were still in switch/router mode. For instance, switch/router 150 can continue to execute spanning tree protocol (STP), routing protocols, and other switch/router functions as it did prior to entering provisional PE mode. The primary difference is that the management CLI/UI presented to the user has changed to allow for PE-related, rather than switch/router-related, configuration.

Once the user has finished entering/validating/saving PE configuration settings in provisional PE mode per block 206, the user may wish to either (1) return to switch/router mode, or (2) reload the device in PE mode (so that switch/router 150 can begin operating in accordance with the entered PE configuration). In the case of option (1), switch/router 150 can receive from the user a request to exit PE mode (e.g., a command to disable the previously entered PE-enable parameter), and in response can immediately switch back to switch/router mode, without requiring a device reload (blocks 208, 210). This will cause switch/router 150 to revert the management CLI/UI so that it presents a look-and-feel, and exposes commands/settings/help options, that are appropriate for switch/router mode.

It should be noted that, upon switching back to switch/router mode, the PE configuration settings entered while switch/router 150 was in provisional PE mode will be preserved in the PE configuration data structures mentioned previously, because these PE configuration data structures are different from the configuration data structures used in switch/router mode. The PE configuration settings may also be persisted in the PE configuration file (if the user issued a save command). This ensures that the PE configuration settings will remain intact if the user returns to provisional PE mode at a later point in time.

In addition, upon returning to switch/router mode, switch/router 150 can automatically remove the PE-enable parameter from the PE configuration file, if the file exists (shown in block 209). As described with respect to FIG. 3 below, switch/router 150 may check for the presence of this parameter at boot time in order to determine whether to begin operation in switch/router mode or PE mode, and thus removing this parameter can prevent switch/router 150 from inadvertently reloading directly into PE mode.

In the case of option (2) (i.e., the user wishes to reload the device into PE mode), switch/router 150 can receive from the user an explicit save command, which causes the current PE configuration to be persisted to the PE configuration file in nonvolatile memory 162 (block 212). Switch/router 150 can then receive from the user a reload command (block 214). In response to the reload command, switch/router 150 can reboot and begin operating in PE mode per the saved PE configuration (block 216). Note that this sequence of steps is the only way in which switch/router 150 can enter PE mode (other than a reload from PE mode itself). This effectively eliminates scenarios where switch/router 150 is switched over from switch/router mode to PE mode due to a user error or an unintentional device reload.

Although not shown in workflow 200, in some cases the user may wish to return to switch/router mode after entering PE mode. In these cases, the user can issue a request to exit PE mode (e.g., a command to disable the PE-enable parameter), save the PE configuration to the nonvolatile PE configuration file, and reload the device. This will cause switch/router 150 to reboot into switch/router mode. In a particular embodiment, switch/router 150 may not allow the user to modify any configuration settings from its local management console when operating in PE mode. In this embodiment, the CB connected to switch/router 150 can send an internal bridge message to the switch/router in order to modify its PE configuration file and to reload. Depending on the implementation, switch/router 150 may continue to carry out PE functions after the PE-enable parameter is disabled (and before the device is reloaded) in PE mode.

It should be appreciated that workflow 200 is illustrative and various modifications are possible. For example, workflow 200 may be easily adapted to facilitate the conversion of switch/router 150 from PE mode to switch/router mode using a provisional switch/router mode. This provisional switch/router mode may be entered from PE mode, and allow the user to edit, validate, and save configuration settings that are specific to switch/router mode, while the device is operating in PE mode. One of ordinary skill in the art will recognize other variations, modifications, and alternatives.

4. Detailed Workflows

Figure 3:
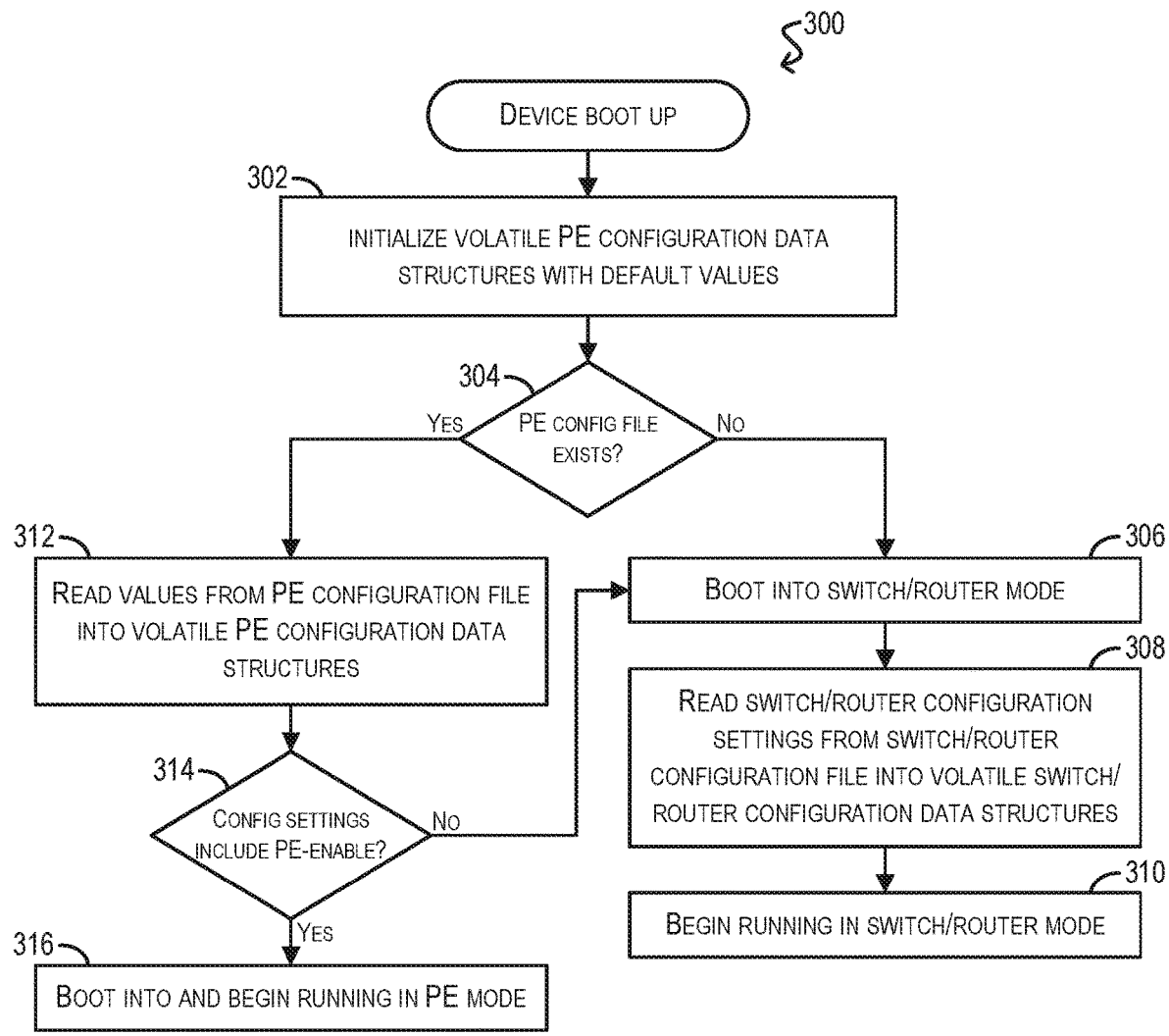
FIG. 3 depicts a workflow that may be executed by the switch/router of FIG. 2 at boot time according to an embodiment.

The remaining portions of this disclosure describe various workflows that elaborate upon the processing performed by switch/router 150 in high-level workflow 200 of FIG. 2. For example, FIG. 3 depicts a workflow 300 that can be performed by switch/router 150 upon being booted up (i.e., reloaded) according to an embodiment.

At block 302, switch/router 150 can initialize its volatile PE configuration data structures with initial (i.e., default) values. Switch/router 150 can then check whether the PE configuration file exists in nonvolatile memory 162 (block 304). If not, switch/router 150 can boot into switch/router mode, read any switch/router configuration settings that may exist in a switch/router configuration file in nonvolatile memory 162 into volatile switch/router data structures, and begin running in switch/router mode in accordance with those settings (blocks 306, 308, 310).

If the PE configuration file does exist in nonvolatile memory 162, switch/router 150 can read the values from the PE configuration file into the PE configuration data structures and can perform another check to determine whether the configuration settings include the PE-enable parameter (blocks 312, 314). If not, switch/router 150 can boot up in switch/router mode as mentioned above. If yes, switch/router 150 can boot into PE mode and begin running in PE mode in accordance with the settings in the PE configuration data structures (block 316).

Figure 4:
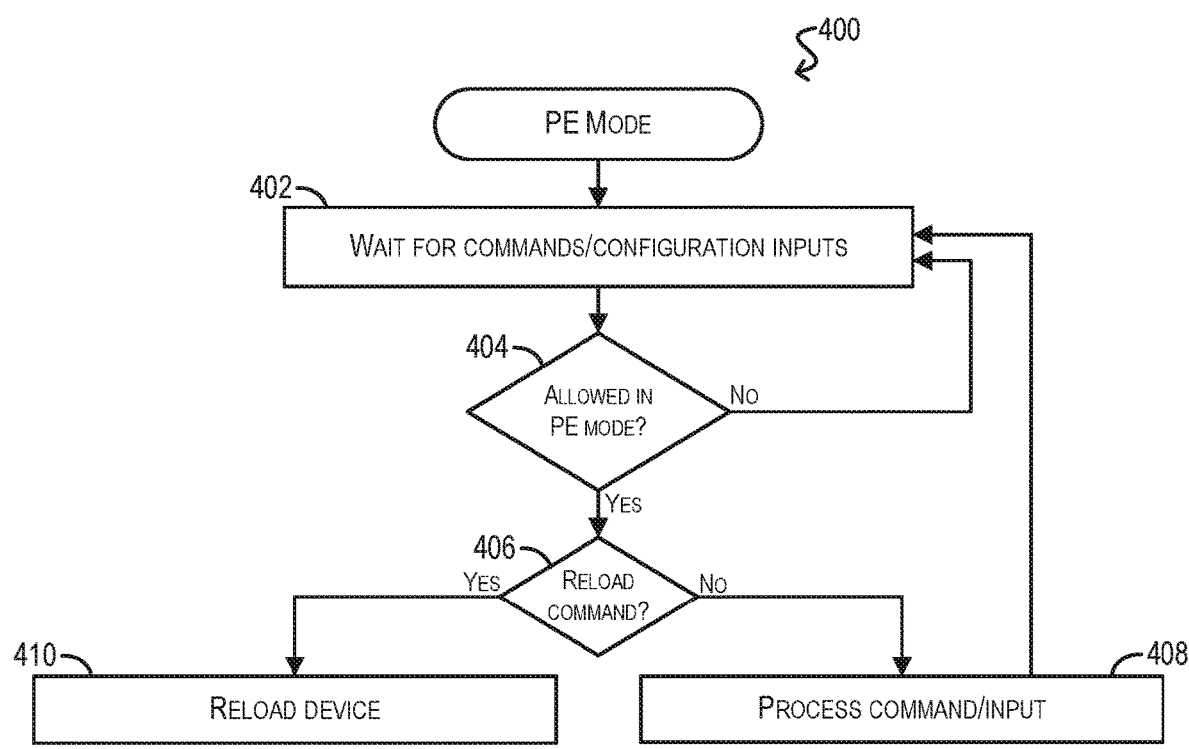
FIG. 4 depicts a workflow that may be executed by the switch/router of FIG. 2 when running in PE mode according to an embodiment.

FIG. 4 depicts a workflow 400 that can be performed by switch/router 150 while running in PE mode (per block 316 of FIG. 3) according to an embodiment.

At block 402, switch/router 150 can wait for any commands and/or configuration inputs that may be received while in PE mode. These can include commands/configuration inputs entered by a user via the management CLI/UI of switch/router 150, as well as commands/configuration inputs transmitted by a CB unit that switch/router 150 is connected to while in PE mode. Upon receiving a command/input, switch/router 150 can check whether the command/input is allowed in PE mode (block 404). If not, switch/router 150 can return to block 402.

Otherwise, switch/router 150 can further check whether the command/input is a reload command (block 406). If it is not a reload command, switch/router 150 can process the command/input as appropriate and return to block 402 (block 408). However, if the command/input is a reload command, switch/router 150 can reload itself (block 410), which causes the device to return to the boot up workflow of FIG. 3.

Figure 5:
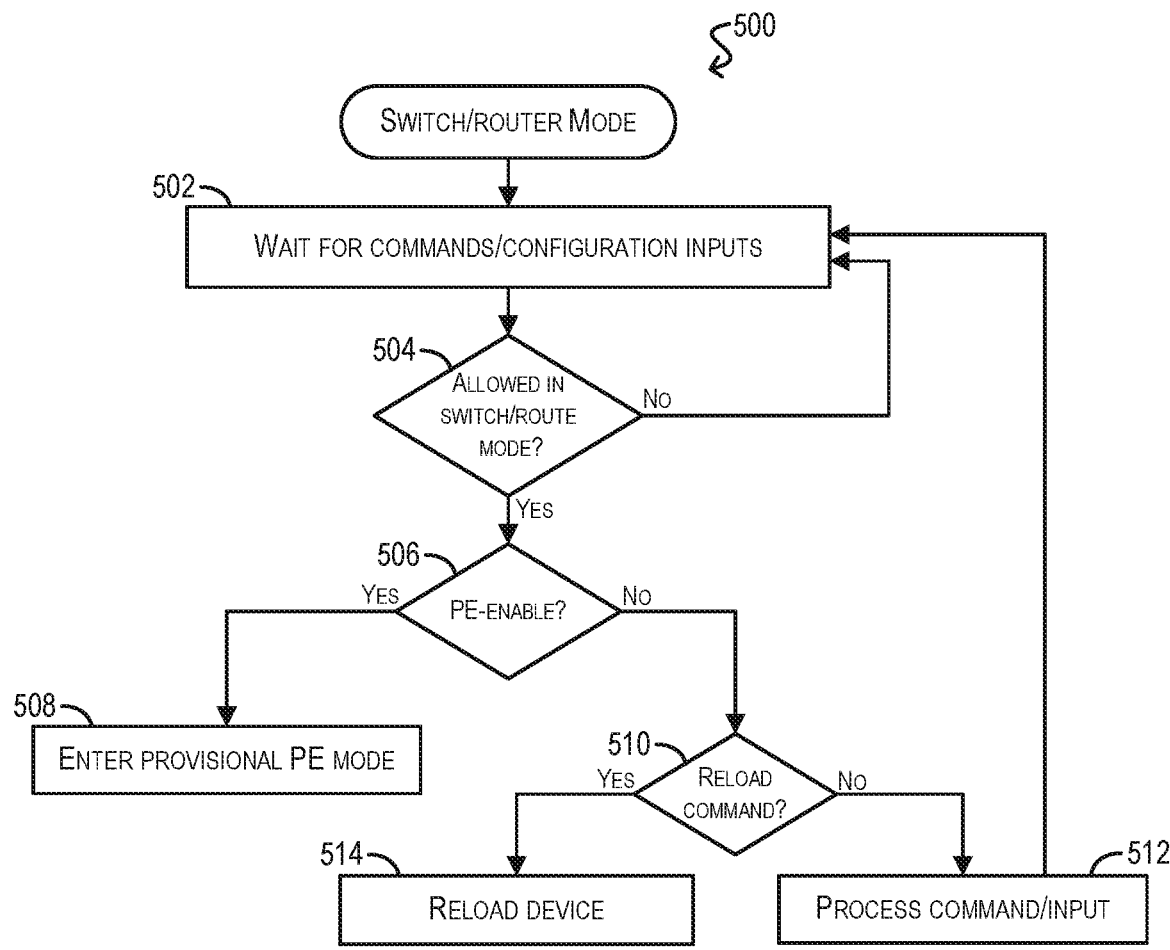
FIG. 5 depicts a workflow that may be executed by the switch/router of FIG. 2 when running in switch/router mode according to an embodiment.

FIG. 5 depicts a workflow 500 that can be performed by switch/router 150 while running in switch/router mode (per block 310 of FIG. 3) according to an embodiment.

At block 502, switch/router 150 can wait for any commands and/or configuration inputs that may be received while in switch/router mode. Upon receiving a command/input, switch/router 150 can check whether the command/ input is allowed in switch/router mode (block 504). If not, switch/router 150 can return to block 502.

Otherwise, switch/router 150 can further check whether the command/input is the PE-enable parameter (block 506). If it is the PE-enable parameter, switch/router 150 can immediately enter provisional PE mode (without a reload) (block 508).

If the command/input is not the PE-enable parameter, switch/router 150 can further check whether the command/input is a reload command (block 510). If it is not a reload command, switch/router 150 can process the command/input as appropriate and return to block 502 (block 512). However, if the command/input is a reload command, switch/router 150 can reload itself (block 514), which causes the device to return to the boot up workflow of FIG. 3.

Figure 6:
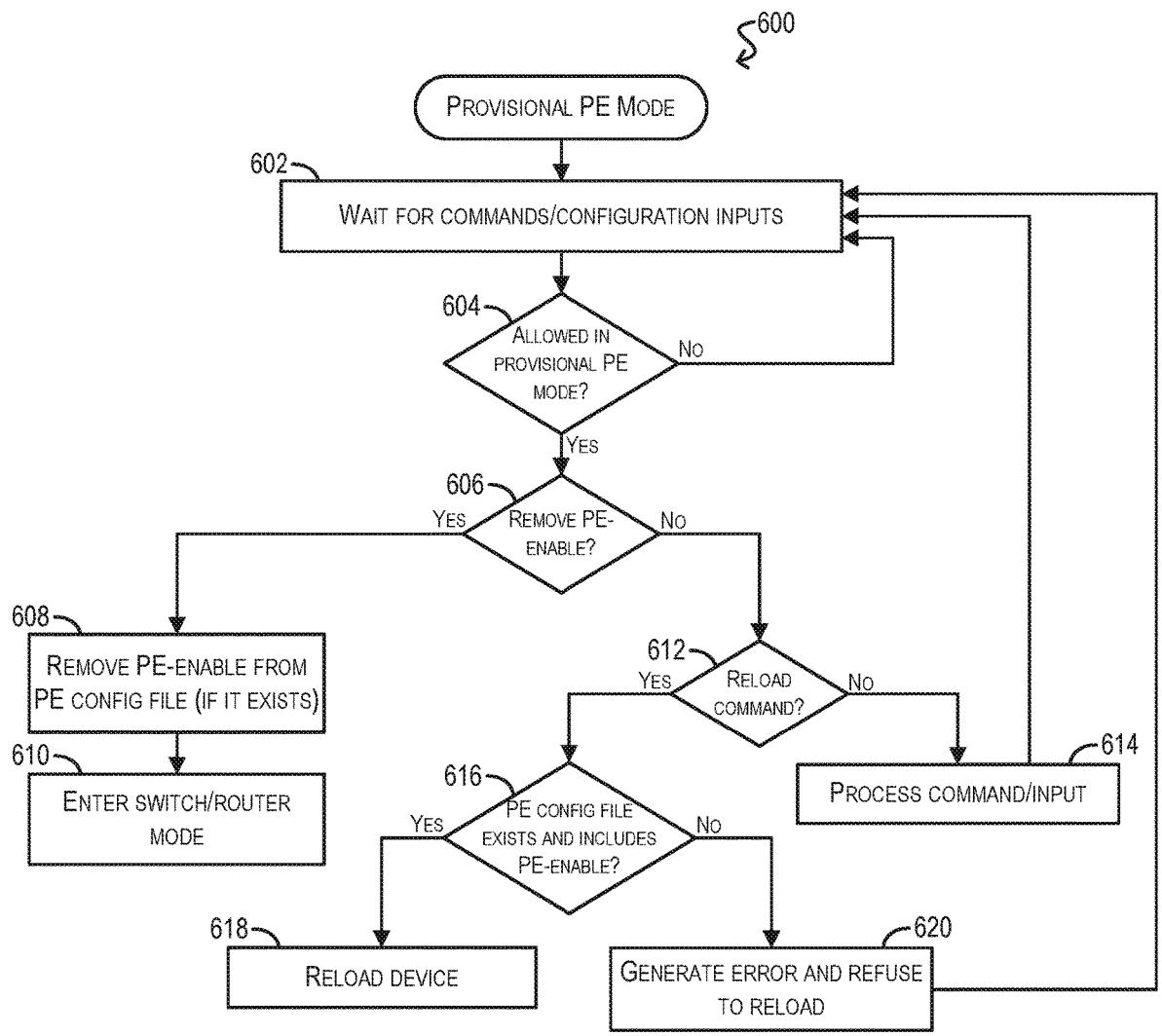
FIG. 6 depicts a workflow that may be executed by the switch/router of FIG. 2 when running in provisional PE mode according to an embodiment.

Finally, FIG. 6 depicts a workflow 600 that can be performed by switch/router 150 while running in provisional PE mode (per block 508 of FIG. 5) according to an embodiment.

At block 602, switch/router 150 can wait for any commands and/or configuration inputs that may be received while in provisional PE mode. Upon receiving a command/input, switch/router 150 can check whether the command/input is allowed in provisional PE mode (block 604). If not, switch/router 150 can return to block 602.

Otherwise, switch/router 150 can further check whether the command/input is a command to remove/disable the PE-enable parameter (block 606). If it is, switch/router 150 can remove the PE-enable parameter from the nonvolatile PE configuration file (if the file exists) and immediately enter switch/router mode (without a reload) (blocks 608, 610).

If the command/input is not a command to remove/disable the PE-enable parameter, switch/router 150 can further check whether the command/input is a reload command (block 612). If it is not a reload command, switch/router 150 can process the command/input as appropriate and return to block 602 (block 614).

However, if the command/input is a reload command, switch/router 150 can check whether the PE configuration file exists and includes the PE-enable parameter (block 616). If so, switch/router 150 can reload itself (block 618), which causes the device to return to the boot up workflow of FIG. 3.

Otherwise, switch/router 150 can generate an error, refuse to reload, and return to block 602 (block 620). This error may be generated because the user has not issued a save command to persist the entered PE configuration to nonvolatile memory 162, and thus the PE configuration will not be available after a reload.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A network device comprising:
a processor; and
a non-transitory computer readable medium having stored thereon program code that, when executed by the processor, causes the processor to:
operate in a third mode of operation, in which network traffic data is processed according to a first mode of operation and in which configuration data for a second mode of operation is received as input and stored in a configuration file;
receive a command to enter the second mode of operation;
reboot the network device responsive to the command to enter the second mode of operation; and
after the reboot of the network device responsive to the command to enter the second mode of operation, check whether the network device can boot into the second mode of operation.

2. The network device of claim 1, wherein the command to enter the second mode of operation is a command to reload the network device.

3. The network device of claim 1, wherein the program code that causes the processor to check whether the network device can boot into the second mode of operation comprises program code that, when executed by the processor, causes the processor to attempt to read values from the configuration file for the second mode of operation.

4. The network device of claim 3, wherein the program code comprises further program code that, when executed by the processor, causes the processor to:
enter the first mode of operation responsive to failing the attempt to read values from the configuration file for the second mode of operation.

5. The network device of claim 1, wherein the program code that causes the processor to read values from the configuration file for the second mode of operation comprises program code that causes the processor to check whether the configuration file includes a value that enables the second mode of operation.

6. The network device of claim 5, wherein the program code comprises further program code that, when executed by the processor, causes the processor to:
enter the second mode of operation responsive to finding the value that enables the second mode of operation.

7. The network device of claim 5, wherein the program code comprises further program code that, when executed by the processor, causes the processor to:
enter the first mode of operation responsive to failing to find the value that enables the second mode of operation.

8. The network device of claim 1, wherein the first mode of operation is a switch/router mode, and wherein the second mode of operation is a port extender mode.

9. A network device comprising:
a processor; and
a non-transitory computer readable medium having stored thereon program code that, when executed by the processor, causes the processor to:
  operate in a third mode of operation, in which network traffic data is processed according to a first mode of operation and in which configuration data for a second mode of operation is received as input and stored in a configuration file;
  receive a command to enter the first mode of operation;
  remove a value enabling the second mode of operation from the configuration file; and
  enable the first mode of operation.

10. The network device of claim 9, wherein the program code that causes the processor to enable the first mode of operation does not reboot the network device.

11. The network device of claim 9, wherein the program code comprises further program code that, when executed by the processor, causes the processor to:
  receive a command to enter the second mode of operation; and
  enter the third mode of operation responsive to receiving the command to enter the second mode of operation.

12. The network device of claim 9, wherein the first mode of operation is a switch/router mode and wherein the second mode of operation is a port extender mode.

13. A method comprising:
  operating a network device in a third mode of operation, in which network traffic data is processed according to a first mode of operation and in which configuration data for a second mode of operation is received as input and stored in a configuration file;
  receiving a command for the network device to enter the second mode of operation;
  rebooting the network device in response to the receiving of the command for the network device to enter the second mode of operation; and
  checking, by the network device and after the rebooting of the network device in response to the receiving of the command, whether the network device can boot into the second mode of operation.

14. The method of claim 13, wherein the command to enter the second mode of operation is a command to reload the network device.

15. The method of claim 13, wherein checking whether the network device can boot into the second mode of operation comprises attempting to read values from the configuration file for the second mode of operation.

16. The method of claim 15, further comprising entering the first mode of operation responsive to failing the attempt to read values from the configuration file for the second mode of operation.

17. The method of claim 13, wherein checking whether the network device can boot into the second mode of operation comprises checking whether the configuration file includes a value that enables the second mode of operation.

18. The method of claim 17, further comprising entering the second mode of operation responsive to finding the value that enables the second mode of operation.

19. The method of claim 17, further comprising entering the first mode of operation responsive to failing to find the value that enables the second mode of operation.

* * * * *